US006498000B2

(12) United States Patent
Murasawa et al.

(10) Patent No.: US 6,498,000 B2
(45) Date of Patent: Dec. 24, 2002

(54) PHOTOCATALYST COMPOSITE AND PROCESS FOR PRODUCING THE SAME

(75) Inventors: Sadao Murasawa, Kusatsu (JP); Hajime Murakami, Kusatsu (JP); Yasuro Fukui, Kusatsu (JP); Mitsuru Watanabe, Kusatsu (JP); Akira Fujishima, 710-5, Nakamaruko, Nakahara-ku, Kawasaki-shi (JP); Kazuhito Hashimoto, Minamikosugaya Jutaku 2-506, 2000-10, Kosugayacho, Sakae-ku, Yokohama-shi (JP)

(73) Assignees: Ishihara Sangyo Kaisha, Ltd., Osaka (JP); Akira Fujishima, Kawasaki (JP); Kazuhito Hashimoto, Yokohama (JP)

( * ) Notice: Subject to any disclaimer, the term of this patent is extended or adjusted under 35 U.S.C. 154(b) by 0 days.

(21) Appl. No.: 09/891,263

(22) Filed: Jun. 27, 2001

(65) Prior Publication Data

US 2001/0046937 A1 Nov. 29, 2001

Related U.S. Application Data

(62) Division of application No. 08/863,393, filed on May 27, 1997, which is a division of application No. 08/638,739, filed on Apr. 29, 1996, now abandoned, which is a continuation of application No. 08/555,548, filed on Nov. 9, 1995, now Pat. No. 5,547,823, which is a continuation of application No. 08/266,464, filed on Jun. 27, 1994, now abandoned.

(30) Foreign Application Priority Data

Jun. 28, 1993 (JP) .............................................. 5-181834
Oct. 26, 1993 (JP) .............................................. 5-291212

(51) Int. Cl.$^7$ .............................................. G03E 1/725
(52) U.S. Cl. ...................... 430/531; 430/947; 430/950; 204/155; 210/763; 252/600; 427/126.5; 427/126.6; 427/212; 427/216; 427/271

(58) Field of Search .................................. 430/531, 947, 430/950; 204/155; 210/763; 252/600; 427/126.5, 126.6, 212, 216, 271

(56) References Cited

U.S. PATENT DOCUMENTS

| 3,324,069 A | 6/1967 | Kablitz |
| 3,340,222 A | 9/1967 | Fang |
| 3,640,712 A | 2/1972 | Field |
| 3,899,333 A | 8/1975 | Berman |
| 3,977,888 A | 8/1976 | Sano |

(List continued on next page.)

FOREIGN PATENT DOCUMENTS

| CN | 92101489.9 | 9/1992 |
| EP | 614682 A1 | 9/1994 |
| JP | 54-150424 | 11/1979 |
| JP | 56121661 A | 9/1981 |
| JP | 58020701 A | 2/1983 |

(List continued on next page.)

OTHER PUBLICATIONS

Handbook of Materials of Construction, Nov. 1987, pp. 1–7.
Handbook of Gypsum and Lime, p 28.
Ceramics, vol. 21 (1986), No. 4, pp 326–333.

Primary Examiner—Hoa Van Le
(74) Attorney, Agent, or Firm—Paul E. White, Jr.; Manelli Denison & Selter PLLC

(57) ABSTRACT

A photocatalyst composite is provided which comprise a substrate having particles of a photocatalyst such as titanium oxide, adhered thereon via a less degradative adhesive such as a fluorinated polymer comprising a copolymer of a vinyl ester and/or vinyl ether and a fluoroolefin, or a silicon based polymer or cement. Furthermore, a process for producing the photocatalyst composite and a coating composition containing the photocatalyst composite are provided.

25 Claims, 1 Drawing Sheet

U.S. PATENT DOCUMENTS

| | | |
|---|---|---|
| 3,998,644 A | 12/1976 | Lodge |
| 4,088,804 A | 5/1978 | Cornwall |
| 4,141,873 A | 2/1979 | Dohang |
| 4,181,530 A | 1/1980 | Ikenoue |
| 4,211,839 A | 7/1980 | Suzuki |
| 4,350,613 A | 9/1982 | Nishino |
| 4,355,060 A | 10/1982 | Cornwell |
| 4,446,250 A | 5/1984 | Niwa |
| 4,495,228 A | 1/1985 | Cornwell |
| 4,544,470 A | 10/1985 | Hetrick |
| 4,585,632 A | 4/1986 | Schneider |
| 4,684,537 A | 8/1987 | Graetzel |
| 4,863,608 A | 9/1989 | Kawai |
| 4,997,576 A | 3/1991 | Heller et al. |
| 5,091,460 A | 2/1992 | Seto et al. |
| 5,104,539 A | 4/1992 | Anderson |
| 5,183,656 A | 2/1993 | Uesaka |
| 5,190,804 A | 3/1993 | Seto et al. |
| 5,194,161 A | 3/1993 | Heller et al. |
| 5,194,543 A | 3/1993 | Schlipf |
| 5,200,479 A | 4/1993 | Kappler |
| 5,202,162 A | 4/1993 | Hart, Jr. |
| 5,203,941 A | 4/1993 | Spain |
| 5,212,267 A | 5/1993 | Kappler |
| 5,216,067 A | 6/1993 | Yamada |
| 5,230,937 A | 7/1993 | Effenberger |
| 5,346,727 A | 9/1994 | Simkin |
| 5,349,003 A | 9/1994 | Kato |
| 5,480,636 A | 1/1996 | Maruo |
| 5,518,992 A | 5/1996 | Linkous |
| 5,595,813 A | 1/1997 | Ogawa |
| 5,616,532 A | 4/1997 | Heller |

FOREIGN PATENT DOCUMENTS

| | | |
|---|---|---|
| JP | 60-232251 | 11/1985 |
| JP | 61-86458 | 5/1986 |
| JP | 61122125 A | 6/1986 |
| JP | 63005301 A | 1/1988 |
| JP | 1-218635 | 8/1989 |
| JP | 1232966 A | 9/1989 |
| JP | 2-144146 | 6/1990 |
| JP | 2251241 A | 10/1990 |
| JP | 2-273514 | 11/1990 |
| JP | 262297 B | 12/1990 |
| JP | 3-008448 A | 1/1991 |
| JP | 3-233100 | 10/1991 |
| JP | 4174679 A | 6/1992 |
| JP | 04284851 A | 10/1992 |
| JP | 4-284851 | 10/1992 |
| JP | 4-334552 | 11/1992 |
| JP | 5111673 A | 5/1993 |
| JP | 05146646 A | 6/1993 |
| JP | 5-146671 | 6/1993 |
| JP | 5-253544 | 10/1993 |
| JP | 5309267 A | 11/1993 |
| JP | 6296874 A | 10/1994 |
| JP | 6-327965 | 11/1994 |
| WO | WO 93/17971 | 9/1993 |

PHOTOCATALYST COMPOSITE AND PROCESS FOR PRODUCING THE SAME

"This is a divisional application of divisional application Ser. No. 08/863,393 filed May 27, 1997, which is a divisional application of application Ser. No. 08/638,739 filed Apr. 29, 1996, now abandoned, which is a continuation of application Ser. No. 08/555,548 filed Nov. 9, 1995, now U.S. Pat No. 5,547,823 which is a continuation of application Ser. No. 08/266,464 now abandoned, filed Jun. 27, 1994."

BACKGROUND OF THE INVENTION

1. Field of the Invention

The present invention relates to a photocatalyst composite comprising a substrate having photocatalyst particles adhered thereon and a process for producing the same.

2. Description of Related Art

Exposure of photocatalyst particles to an irradiation of a wavelength corresponding to not less than the band gap energy causes the photoexcitation of electrons into a conduction band with a corresponding generation of holes in a valence band. The strong reduction power of the electrons and the strong oxidation power of the holes generated by this optical excitation have been utilized in decomposition and purification of organic materials as well as in decomposition of water. The photocatalyst particles to be used in such treatments are usually deposited on a substrate of dimensions larger than the photocatalyst particles in order to prevent them from scattering into the air or exhausting out of the system and subsequently to provide for easy separation of the photocatalyst from the treatment system. The deposition of photocatalyst particles on a substrate has been accomplished by a method comprising sintering the photocatalyst particles on the substrate at a temperature of 400° C. or higher to adhere the particles to the substrate, or a method comprising spraying a precursor, which can be converted to photocatalyst through thermal decomposition, onto a substrate heated at a temperature of about 400° C., thereby adhering the particles on the substrate. Alternatively, there has been proposed a method immobilizing photocatalyst particles using a certain type of fluorinated polymer. For example, Japanese Patent KOKAI (Laid-open) No. Hei 4-284851 discloses a method comprising laminating a mixture of photocatalyst particles and a fluorinated polymer and compressing the laminate under a pressure. Japanese Patent KOKAI (Laid-open) No. Hei 4-334552 discloses a method comprising thermally fusing a fluorinated polymer to adhere photocatalyst particles thereto.

Recently, an attempt has been made to use photocatalyst particles for decomposition of deleterious materials, malodorous materials and oily substances in the waste products produced daily in inhabitant circumstances as well as purification and sterilization of the waste products. Thus the photocatalyst particles have found ever broadening areas of application. In this regard, there is a need for a method capable of adhering firmly photocatalyst particles onto any substrate, which adhesion can be maintained over an extended period of time, without losing their photocatalytic function. Unfortunately, the prior art methods as described above suffer from insufficient adhesion strength as being susceptible to delamination under external pressure, and they require heating at high temperatures so that they can not apply to a substrate not resistant to heat such as plastics, interior materials such as office walls and the surfaces of various products which are difficult to heat, and the like. In addition, there are problems that the thermal treatments at high temperatures cause the photocatalyst particles to reduce their specific surface area resulting in a reduction in their photocatalytic function. Moreover, there may be required specific means such as devices for adhering under pressure, or fusing under heat.

SUMMARY OF THE INVENTION

One object of the present invention is to provide a photocatalyst composite comprising a substrate having photocatalyst particles adhered thereon via a less degradative adhesive.

Another object of the present invention is to provide a process for producing the photocatalyst composite.

A further object of the present invention is to provide a coating composition using the photocatalyst composite.

DETAILED DESCRIPTION OF PREFERRED EMBODIMENTS

Figure 1:
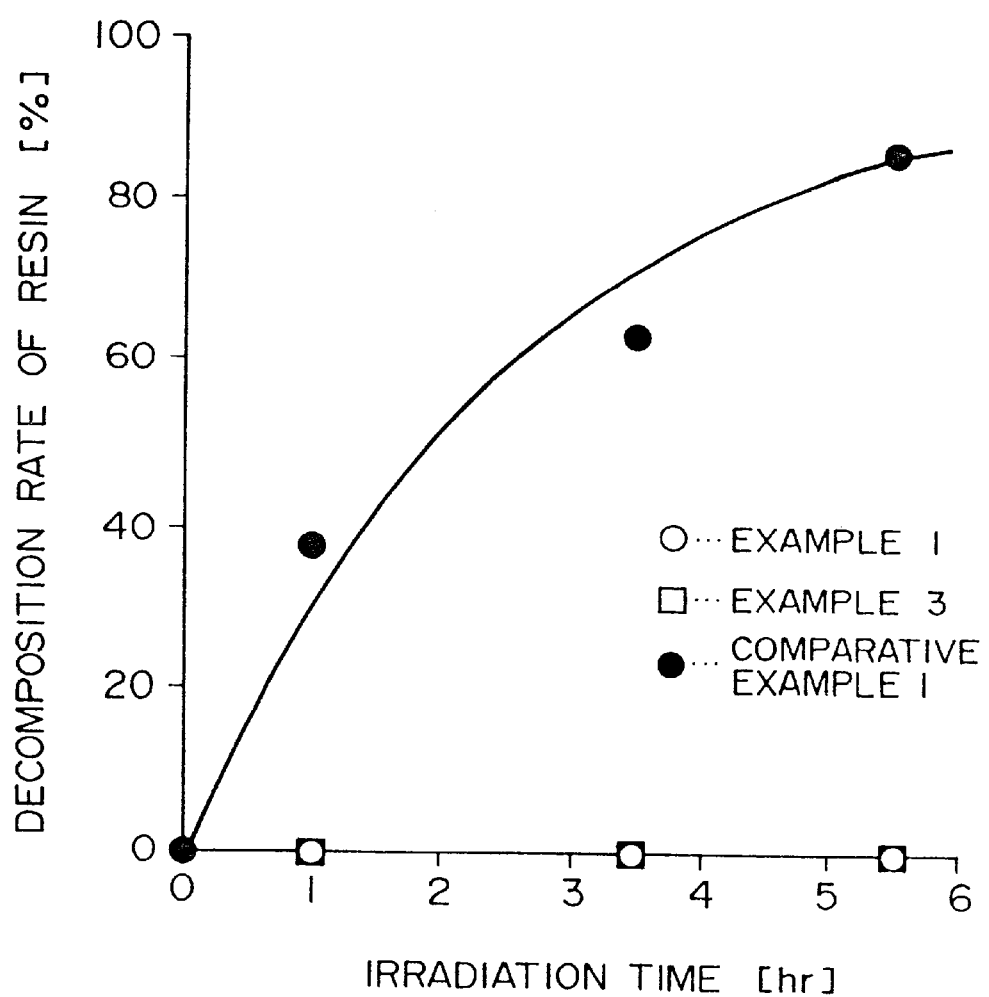
FIG. 1 shows variations in weight loss per unit area of the adhesives in the photocatalyst composites due to irradiation with the black light for Samples A and C from Examples and Sample E from Comparative Example.

The present inventors have made a research to develop a process for achieving a firm adhesion of photocatalyst particles onto any substrate over an extended period of time without damaging the photocatalytic function of the particles. As a result, the present invention has been completed on the basis of the discovery that (1) when photocatalyst particles are adhered onto a substrate with an adhesive, the photocatalytic function of the photocatalyst particles may decompose and deteriorate the adhesive causing the photocatalyst particles to release from the substrate, and however, the use of a less degradative adhesive allows adhesion of the photocatalyst particles onto any substrate without causing the release of the particles therefrom and unpredictably the photocatalyst of the present invention to exhibit sufficient photocatalytic function, (2) the photocatalyst particles may be adhere d to a substrate without lowering the photocatalytic function of the resultant photocatalyst composite when the amount of the photocatalyst particles is in the range of 5 to 98 % based on the total volume of the photocatalyst particles and the less degradative adhesive, (3) the use of organic adhesives such as fluorinated polymers and silicone based polymers or inorganic adhesives as less degradative adhesives results in most reduced decomposition and degradation of the adhesives owing to the photocatalytic function of the photocatalyst particles so that the photocatalyst particles can be firmly adhered for a long time, and particularly a fluorinated polymers comprising primarily a copolymer of vinylethers and/or vinylesters and fluoroolefins are preferred, (4) preferred photocatalyst particles are titanium oxide which has a high photocatalytic function, a high chemical stability and no toxicity, and that (5) a process for adhering photocatalyst particles, which is applicable to rendering relatively easily the surfaces of various products photocatalytic and which enables the photocatalytic function to be readily utilized in domestic appliances, comprises the steps of disposing photocatalyst particles and a less degradative adhesive on a substrate and then fixing the adhesive as a preferably convenient and easy process, or more particularly comprises the steps of disposing photocatalyst particles and a less degradative adhesive by coating or spraying a coating composition containing the photocatalyst particles, the adhesive and a solvent on the surfaces of a substrate such as various products and then fixing the adhesive.

That is, the present invention lies in providing a photocatalyst composite comprising any substrate having photocatalyst particles firmly adhered thereon for an extended period of time without losing the photocatalytic function of the particles.

The present invention is a photocatalyst composite comprising a substrate having photocatalyst particles adhered via a less degradative adhesive. As used in the present invention, the term "less degradative adhesive" refers to an adhesive having an extremely reduced rate of decomposition due to the photocatalytic function possessed by the photocatalyst particles in the range of 10% or less, preferably 5% or less, more preferably 3% or less, most preferably 1% or less expressed as a weight loss of the adhesive in the photocatalyst composite as measured by the method described in the Example below. A weight loss higher than 10% indicates undesirably vigorous decomposition or degradation of the adhesive with a great amount of the photocatalyst particles being released. The less degradative adhesives to be used in the present invention include, for example, inorganic adhesives such as silicon compounds such as water glass, colloidal silica, polyorganosiloxanes and the like, phosphates such as zinc phosphate, aluminum phosphate and the like, biphosphates, cement, lime, gypsum, enamel frits, glass lining glazes, plasters, organic adhesives such as fluorinated polymers, silicone based polymers and the like, and these adhesives may be used in combination of two or more thereof. Particularly inorganic adhesives, fluorinated polymers and silicone based polymers are preferred in view of adhesion strength. The cement to be used include, for example, Portland cements such as rapid-hardening cement, general-use cement, moderate heat cement, sulfate-resisting cement, white cement, oil well cement, and geothermal well cement, blended cement such as fly-ash cement, sulfated slag, silica cement, and blast furnace cement, aluminous cement and the like. The plaster to be used includes, for example, gypsum plaster, lime plaster, dolomite plaster and the like. The fluorinated polymers to be used include, for example, crystalline fluorinated resins such as polyvinyl fluorides, polyvinylidene fluorides, polyethylene trifluorochlorides, polyethylene tetrafluorides, tetrafluoroethylene-hexafluoropropylene copolymers, ethylene-polyethylene tetrafluoride copolymers, ethylene-ethylene trifluorochloride copolymers, tetrafluoroethylene-perfluoroalkylvinyl ether copolymers, amorphous fluorinated resins such as perfluorocyclo polymers, vinylether-fluoroolefin copolymers, vinylester-fluoroolefin copolymers, various fluorinated elastomers and the like. Particularly fluorinated polymers comprising primarily vinylether-fluoroolefin copolymers and vinylester-fluoroolefin copolymers are preferred because they are susceptible to less decomposition and degradation and easy to handle. The silicone based polymers to be used include linear silicone resins, acryl-modified silicone resins, various silicone elastomers and the like.

As used in the present invention, the term "photocatalyst particles" refers to those capable of exhibiting photocatalytic function upon irradiation with a radiation having a wavelength corresponding to not less than the band gap energy. The photocatalyst particles to be used include one or a combination of two or more of known metal compound semiconductors such as titanium oxide, zinc oxide, tungsten oxide, iron oxide, strontium titanate, and the like. Particularly titanium oxide which has a high photocatalytic function, a high chemical stability and no toxicity is preferred. In addition, it is preferred to include inside said photocatalyst particles and/or on the surfaces thereof at least one metal and/or a compound thereof selected from the group consisting of V, Fe, Co, Ni, Cu, Zn, Ru, Rh, Pd, Ag, Pt and Au as a second component because of the higher photocatalytic function of the resulting photocatalyst particles. The aforementioned metal compounds include, for example, metal oxides, hydroxides, oxyhydroxides, sulfates, halides, nitrates, and even metal ions. The content of the second component may vary depending upon the kind thereof. Preferred photocatalyst particles which may contain the aforementioned metals and/or metal compounds are of titanium oxide. The content of photocatalyst particles is preferably in the range of 5 to 98% by volume based on the total amount of the photocatalyst particles and the less degradative adhesive. The content of the photocatalyst particles less than the above defined range tends undesirably to result in a reduced photocatalytic function of the resulting photocatalyst, while that higher than the above defined range tends also undesirably to cause a reduction in adhesion strength. When cements or gypsum are used as less degradative adhesives, the content of the photocatalyst particles should be preferably from 5 to 40%, most preferably from 5 to 25%. Alternatively, when organic or inorganic adhesives other than the cement and gypsum are used as less degradative adhesives, the content of the photocatalyst particles should be preferably from 20 to 98%, more preferably 50 to 98% and most preferably 70 to 98%.

The photocatalyst particles to be used in the present invention may be produced by any one of known techniques. For example, there are several methods including (1) a method comprising thermally hydrolyzing a titanium compound such as titanyl sulfate, titanium chloride, titanium alkoxides, and the like, if necessary, in the presence of seeds for nucleation, (2) a method comprising neutralizing a titanium compound such as titanyl sulfate, titanium chloride, titanium alkoxides, and the like, by adding an alkali, if necessary, in the presence of seeds for nucleation, (3) a method comprising oxidizing titanium chloride, titanium alkoxides, and the like in the vapor phase, and (4) a method comprising firing or hydrothermally treating the titanium oxides produced by any one of the methods (1) and (2). Specifically those titanium oxides obtained by the method (1) or by the hydrothermal treatment at temperatures of 100° C. or higher are preferred because of their higher photocatalytic function. As used in the present invention, the term "titanium oxides" is meant to indicate those so-called hydrated titanium oxide, hydrous titanium oxide, metatitanates, orthotitanates, titanium hydroxide, besides titanium oxide, regardless of their crystal system. In order to allow at least one metal and/or compound thereof selected from the group consisting of V, Fe, Co, Ni, Cu, Zn, Ru, Rh, Pd, Ag, Pt and Au as a second component to be present inside the photocatalyst particles and/or on the surfaces thereof, one can employ a method comprising adding the metal and/or the compound to be adsorbed during the production of the photocatalyst particles, or a method comprising adding the metal and/or the compound to be adsorbed after the production of the photocatalyst particles, if necessary, under heat, or if necessary, using reduction.

The substrates to be used in the present invention include inorganic articles such as ceramics and glasses, organic articles such as plastics, elastomers, woods and paper sheets, and metallic articles made of a metal such as aluminum or an alloy such as steel. Dimensions and forms of the substrates are not critical. Even coated articles may be used.

In the present invention, it is preferred that both the photocatalyst particles and an adsorbent are adhered onto a substrate via the less degradative adhesive because there coexist an action adsorbing treatment materials. The adsorbents to be used include general adsorbents such as activated carbon, zeolites, silica gels, and the like.

In another aspect of the present invention, a first layer consisting of an adhesive without containing any photocatalyst particles is provided on a substrate, and then a second layer consisting of a less degradative adhesive and photocatalyst particles is provided on the first layer. The provision of the first layer containing no photocatalyst particle enables a firm connection between the substrate and the second layer containing the photocatalyst particles resulting in a firmer adhesion of the photocatalyst particles onto the substrate sustainable for a longer period of time. Moreover, the first layer should preferably contain inorganic particles having no photocatalytic function as filler. Such inorganic particles to be used include those of titanium oxides, silicon oxide, aluminum oxide, magnesium oxide and the like, the surfaces of which are coated with silicon oxide, aluminum oxide, or zirconium oxide.

The photocatalyst composite according to the present invention may be produced by disposing photocatalyst particles and a less degradative adhesive on at least a part of a substrate and then fixing the adhesive to adhere the photocatalyst particles onto the substrate via the adhesive. In the present invention, specifically the photocatalyst particles and the less degradative adhesive should preferably be dispersed in a solvent to prepare a coating composition which is then coated or sprayed on a substrate to dispose the photocatalyst particles and the less degradative adhesive on at least a part of the substrate. The solvents to be used include water, and organic solvents such as toluene, alcohols, and the like. The less degradative adhesives to be contained in the coating composition include the aforementioned ones which should preferably be soluble to the solvents used. In the present invention, the less degradative adhesive contained in the coating composition is preferably one or more polymers selected from the group consisting of a fluorinated polymer and a silicone based polymer. The amount of the photocatalyst particles is in the range of 5 to 98% by volume, preferably 20 to 98% by volume, more preferably 50 to 98% by volume, and most preferably 70 to 98% by volume, based on the total amount of the photocatalyst particles and the less degradative adhesive. The coating compositions may be formulated with cross linking agents, dispersants and fillers. The cross linking agents to be used include ordinary ones of isocyanate family and melamine family and the dispersants to be used include coupling agents. Particularly when the content of the photocatalyst particles in the coating composition is in the range of 40 to 98% by volume based on the total amount of the photocatalyst particles and the less degradative adhesive, it is preferred to formulate the coating composition with a coupling agent. The amount of the coupling agents to be added should be preferably from 5 to 50%, more preferably 7 to 30%.

The application of the coating composition may be accomplished by coating or spraying according to any one of ordinary coating techniques including immersing, dip-coating, spin-coating, blade coating, roller coating, wire bar coating, reversal roll coating, or an ordinary spraying technique such as spray coating to dispose the photocatalyst particles and the less degradative adhesive on at least a part of the substrate. If necessary, before the application of the photocatalyst particles and the less degradative adhesive onto the substrate by coating or spraying, an organic adhesive such as acrylic resins, epoxy resins, polyester resins, melamine resins, urethane resins, alkyd resins and the like, or such a less degradative adhesive as mentioned above may be coated or sprayed onto the substrate to from a first layer and then on the first layer there is provided a second layer consisting of the photocatalyst particles and the less degradative adhesive by coating or spraying the coating composition. The organic adhesive may be of such a kind as normally used.

After coating or spraying, the composition is fixed to produce the photocatalyst composite of the present invention. The fixation may be performed by a technique of drying, irradiating with ultraviolet rays, heating, cooling, or using a cross linking agent and it is achieved at a temperature lower than 400° C., preferably from room temperature to 200° C. In this regard, a temperature higher than 400° C. may undesirably cause thermal degradation of the adhesive rendering the photocatalyst particles readily releasable. The present invention prefers to employ a method for fixation with cross linking agents of isocyanate family and melamine family.

The photocatalyst composite according to the present invention can cause purification and sterilization of products containing deleterious materials, malodorous materials and oily materials as well as decomposition of such materials which come into the vicinity of the photocatalyst particles by irradiating with a ray having a wavelength corresponding to not less than the band gap energy. The radiations to be used for the exposure include light rays including ultraviolet rays, for example, the sun's rays, and lights from fluorescent lamp, black lamp, halogen lamp, xenon flash lamp, mercury lamp and the like. Particularly the light rays including near ultraviolet rays of 300 to 400 nm are preferred. The intensity and the time of irradiation with the light rays can be determined routinely depending upon the amounts of materials to be treated.

The present invention will be illustrated below with reference to some examples.

EXAMPLE 1

To an acidic titania sol obtained by thermal hydrolysis of titanyl sulfate (CS-N, available from Ishihara Sangyo Kaisha, Ltd.), there was added sodium hydroxide to adjust the pH to 7, followed by filtration and washing. Then, to the resulting titanium oxide wet cake was added water to prepare a slurry of 100 grams/liter expressed as $TiO_2$. Sodium hydroxide was added to this slurry to adjust the pH to 10, and then hydrothermal treatment was conducted in an autoclave at a temperature of 150° C. for 3 hours. Then the slurry after the hydrothermal treatment was neutralized to pH 7 by adding nitric acid, filtered, and washed with water, followed by drying at a temperature of 110° C. for 3 hours to yield titanium oxides.

Then, mixtures of compositions indicated below were shaken in a paint shaker for 3 hours to effect sufficient mixing, and dispersed to produce a coating composition. The LUMIFRON LF 200C as referred to below is a fluorinated polymer comprising primarily a copolymer of vinylether and fluoroolefin.

| | |
|---|---|
| Titanium oxides | 9.80 grams |
| Florinated polymer (LUMIFRON LF200C, available from Asahi Glass Co., Ltd.) | 0.80 gram |
| Isocyanate based curing agent | 0.16 gram |
| Titanium coupling agent (PLANEACT 338x, available from Ajinomoto Co., Inc.) | 1.00 gram |
| Toluene | 23.60 ml |

The coating composition of the above formulation was coated on a glass plate of 20 $cm^2$, and then dried at a temperature of 120° C. for 20 minutes to produce a photocatalyst composite of the present invention (Sample A). This Sample A had a titanium oxide content of 90% by volume based on the total amount of the titanium oxides and the less degradative adhesive.

EXAMPLE 2

By using the same titanium oxides as used in Example 1, the mixtures of compositions indicated below were shaked in a paint shaker for 3 hours to effect sufficient mixing, and dispersed to produce a coating composition.

| | |
|---|---|
| Titanium oxides | 7.64 grams |
| Florinated polymer (LUMIFRON LF200C, available from Asahi Glass Co., Ltd.) | 2.36 gram |
| Isocyanate based curing agent | 0.47 gram |
| Titanium coupling agent (PLANEACT 338x, available from Ajinomoto Co., Inc.) | 0.76 gram |
| Toluene | 22.50 ml |

The coating composition of the above formulation was coated on a glass plate of 20 $cm^2$, and then dried at a temperature of 120° C. for 20 minutes to produce a photocatalyst composite of the present invention (Sample B). This Sample B had a titanium oxide content of 70% by volume based on the total amount of the titanium oxides and the less degradative adhesive.

EXAMPLE 3

By using the same titanium oxides as used in Example 1, the mixtures of compositions indicated below were shaked in a paint shaker for one hour to effect sufficient mixing, and dispersed to produce a coating composition.

| | |
|---|---|
| Titanium oxides | 9.8 grams |
| Polyorganosiloxane based inorganic adhesive (a mixture of T2202A and T2202B in a ratio of 3:1, available from Japan Synthetic Rubber Co., Ltd.) | 2.7 grams |
| Isopropyl alcohol | 21.5 ml |

The coating composition of the above formulation was coated on a glass plate of 20 $cm^2$, and then dried at a temperature of 180° C. for 10 minutes to produce a photocatalyst composite of the present invention (Sample C). This Sample C had a titanium oxide content of 90% by volume based on the total amount of the titanium oxides and the less degradative adhesive.

EXAMPLE 4

To an acidic titania sol obtained by thermal hydrolysis of titanyl sulfate (CS-N, available from Ishihara Sangyo Kaisha, Ltd.), there was added sodium hydroxide to adjust the pH to 7, followed by filtration and washing. Then, the resulting titanium oxide wet cake was dried at a temperature of 110° C. for 3 hours to obtained titanium oxides.

Then, the mixtures of compositions indicated below were shaked in a paint shaker for 3 hours to effect sufficient mixing, and dispersed to produce a coat composition.

| | |
|---|---|
| Titanium oxides | 7.0 grams |
| Polyorganosiloxane based inorganic adhesive (a mixture of T2202A and T2202B in a ratio of 3:1, available from Japan Synthetic Rubber Co., Ltd.) | 4.3 grams |
| Isopropyl alcohol | 22.5 ml |

The coating composition of the above formulation was coated on a glass plate of 20 $cm^2$, and then dried at a temperature of 180° C. for 10 minutes to produce a photocatalyst composite of the present invention (Sample D). This Sample D had a titanium oxide content of 80% by volume based on the total amount of the titanium oxides and the less degradative adhesive.

Comparative Example 1

By using the same titanium oxides as used in Example 1, the mixtures of compositions indicated below were shaked in a paint shaker for one hour to effect sufficient mixing, and dispersed to produce a coating composition.

| | |
|---|---|
| Titanium oxides | 9.8 grams |
| Vinyl acetate-acryl copolymer (BONCOAT 6290, available from Dainippon Ink & Chemicals, Inc.) | 0.7 gram |
| Water | 24.8 ml |

The coating composition of the above formulation was coated on a glass plate of 20 $cm^2$, and then dried at a temperature of 120° C. for 10 minutes to produce a photocatalyst composite (Sample E). This Sample E had a titanium oxide content of 90% by volume based on the total amount of the titanium oxides and the adhesive.

The photocatalyst composites obtained in Examples and Comparative Example (Samples A to E) were exposed to the black light at an ultraviolet intensity of 7 $mW/cm^2$ on the surface of each Sample for 5 hours. The adhesive in the photocatalyst composite was weighed before and after the irradiation with the black light to determine the weight loss. As a result, no weight loss was observed for the Samples A to D of the present invention indicating no decomposition of the adhesives. However, the Sample E of the Comparative Example without using any less degradative adhesive exhibited a weight loss of 85% indicating that most of the adhesive was decomposed by the photocatalytic function of titanium oxides. In addition, it was observed that the Sample E was yellowed and the titanium oxide particles were partly released. The variation in the weight loss of the adhesive in the photocatalyst composite owing to the irradiation with the black light for each of the Samples A and C from Examples and the Sample E from Comparative Example is shown in FIG. 1. The Samples A and B from Examples 1 and 2 contained the coupling agents which were adsorbed on the surfaces of the photocatalyst particles to bridge between the less degradative adhesive and the photocatalyst particles so that the photocatalyst particles did not come into direct contact with the adhesive rendering the latter less decomposable.

Next, each of the Samples A to D of the present invention was placed in a 3 liters glass vessel and acetaldehyde as a malodorous component was added to the vessel to a concentration of 90 ppm and then the vessel was sealed. Then, the vessel was exposed to a mercury lamp at an ultraviolet intensity of 14 $mW/cm^2$ on the surfaces of each Sample for 60 minutes. After the irradiation, the concentration of acetaldehyde in the glass vessel was measured. The results are indicated in Table 1. The Samples A to D achieved an efficient decomposition of acetaldehyde due to the photocatalytic function of titanium oxides.

TABLE 1

|  | Sample | Concentration of acetaldehyde (ppm) |
|---|---|---|
| Example 1 | A | 0.5 |
| Example 2 | B | 0.5 |
| Example 3 | C | 30.0 |
| Example 4 | C | 0.5 |

EXAMPLE 5

To an acidic titania sol obtained by thermal hydrolysis of titanyl sulfate (CS-C, available from Ishihara Sangyo Kaisha, Ltd.), there was added sodium hydroxide to adjust the pH to 7, followed by filtration, washing, drying, and then pulverizing to produce titanium oxides. 0.2 gram of the titanium oxides, 0.8 gram of white cement (available from Onoda Cement Co., Ltd.) and 0.7 gram of water were mixed and the whole was coated on a glass plate of an area of 50 $cm^2$ and dried at room temperature to produce a photocatalyst composite of the present invention (Sample F). This Sample F had a titanium oxide content of 17% by volume based on the total amount of the titanium oxides and the less degradative adhesive.

EXAMPLE 6

The same procedure as in Example 5, except that 0.8 gram of DENCA high alumina cement (Hi, available from DENKI KAGAKU KOGYO K.K.) was employed instead of the white cement, was repeated to produce a photocatalyst composite of the present invention (Sample G). This Sample G had a titanium oxide content of 17% by volume based on the total amount of the titanium oxides and the less degradative adhesive.

Comparative Example 2

1.0 gram of the same white cement as used in Example 5 and 0.7 gram of water were mixed and the whole was coated on a glass plate having a surface area of 50 $cm^2$ and dried to produce Sample H.

Comparative Example 3

1.0 gram of the same DENCA high alumina cement as used in Example 6 and 0.7 gram of water were mixed and the whole was coated on a glass plate having a surface area of 50 $cm^2$ and dried to produce Sample I.

Each of the Samples F to I from Examples and Comparative Examples was placed in a 4 liters vessel and standard nitrogen monoxide gas was injected into the vessel. Then, the vessel was exposed to the rays from the black light at an ultraviolet intensity of 1 $mW/cm^2$ on the surfaces of each Sample and the concentration of NOx gases in the glass vessel was measured with time by means of a NOx sensor (11L, available from GASTEC Co. Ltd.). The results are indicated in Table 2. The Samples F and G from Examples 5 and 6 caused a great reduction in NOx gas concentration, while the Samples H and I from Comparative Examples 2 and 3 caused little variation in NOx gas concentration. It has been found from this fact that the photocatalyst of the present invention is effective for removing nitrogen monoxide by oxidation thereof. In the procedure as described above, the weight of the cement in each of the Samples F and G was measured to evaluate the weight loss of the cement. No weight loss was observed indicating no decomposition of the cement.

TABLE 2

|  |  | Concentration of NOx (ppm) after | | | |
|---|---|---|---|---|---|
|  | Sample | 0 min. | 10 min. | 20 min. | 30 min. |
| Example 5 | F | 18.8 | 8.9 | 3.1 | 1.2 |
| Example 6 | G | 13.5 | 0.3 | 0 | 0 |
| Comp. Example 2 | H | 15.5 | 13.5 | 13.5 | 13.5 |
| Comp. Example 3 | I | 13.5 | 13.2 | 10.6 | 10.6 |

EXAMPLE 7

All the coating composition obtained by repeating the procedure identical to that in Example 1 was coated on a transparent acrylic plate having a surface area of 100 $cm^2$ and dried at a temperature of 120° C. for 20 minutes to produce a photocatalyst composite of the present invention (Sample J). This Sample J had a titanium oxide content of 90% by volume based on the total amount of the titanium oxides and the less degradative adhesive.

Comparative Example 4

The same acrylic plate as used in Example 7 was employed as Sample K.

Each of the Samples J and K from the aforementioned Example and Comparative Example was on the inner walls of a 50 liters water bath. 45 liters of water and 20 goldfish (Wakin) were placed in the bath and irradiated externally with the light rays from two 20 W fluorescent lamps.

After the goldfish was raised for two weeks, it was observed that algae were deposited on the surfaces of the Sample K from Comparative Example 4, while no deposition of algae was observed on the surfaces of the Sample J from Example 7. This is because even when algae were deposited on the surfaces of the Sample J from Example 7, they were immediately decomposed by the photocatalytic function. In the procedure as described above, the fluorinated polymer in the Sample J was measured for the weight loss. No weight loss was observed indicating no decomposition of the fluorinated polymer.

EXAMPLE 8

The same procedure as in Example 7 was repeated, except that a mixture of the composition indicated below was shaked in a paint shaker for one hour to effect sufficient mixing and dispersed to produce a coating composition which was all coated on a transparent acrylic plate by means of a spin coater (1000 r.p.m.×10 Sec) and that the resulting transparent acrylic plate having a first layer consisting of the less degradative adhesive without any photocatalyst particles on the surface thereof was used as a substrate, to produce a photocatalyst of the present invention (Sample L). The content of titanium oxides, i.e. the photocatalyst particles in the second layer, of this Sample L was 90% by volume based on the total amount of the titanium oxides and the less degradative adhesive.

| | |
|---|---|
| Titanium oxides having no photocatalytic function (CR-90, available from Ishihara Sangyo Kaisha, Ltd.) | 3.3 grams |
| Florinated polymer (LUMIFRON LF200C, available from Asahi Glass Co., Ltd.) | 5.5 grams |
| Isocyanate based curing agent | 1.1 grams |
| Toluene | 20.7 ml |

Measurements of the weight loss of the adhesive used for Sample L in the aforementioned procedures revealed that there was found no weight change in Sample L of the present invention, and the adhesive was not degraded and the titanium oxide photocatalyst particles were not released from the substrate. The film strength of Sample L of Example 8 was 3H in terms of pencil hardness, which means that the photocatalyst particles were firmly adhered. Furthermore, the Sample L was placed in a flow of water and irradiated with the black light in such a manner that the superficial ultraviolet intensity was 2 mW/cm$^2$ for 3 weeks. However, there was observed no releasing of the titanium oxide photocatalyst particles from the substrate.

EXAMPLE 9

The same procedure as in Example 1 was repeated, except that titanium oxide particles coated with a zinc compound were used instead of the titanium oxides, to produce a photocatalyst composite of the present invention (Sample M). The content of the photocatalyst titanium oxide particles coated with the zinc compound in this Sample M was 90% by volume based on the total amount of the photocatalyst particles and the less degradative adhesive.

The titanium oxide particles coated with the zinc compound were prepared as follows:

Water and sodium hydroxide were added to a slurry of titanium oxide obtained by thermally hydrolyzing titanyl sulfate to form a slurry having a pH of 10 and 100 grams/liter expressed as $TiO_2$. This slurry was subjected to the hydrothermal treatment in an autoclave at 150° C. for 5 hours and then neutralized with nitric acid, filtered and washed with water. To the resultant titanium oxide wet cake was added water to prepare a slurry containing 100 grams/liter expressed as $TiO_2$. To the resultant slurry was added hydrochloric acid to form the slurry having a pH of 4. To one liter of this slurry was dropwise added 7.2 ml of an aqueous 1 mol/liter zinc chloride solution under stirring. Then, the slurry was neutralized with a 2N sodium hydroxide solution, filtered and washed with water. Thereafter, the resultant product was dried at 120° C. for 16 hours and pulverized to form titanium oxide particles having a zinc compound carried thereon in a $ZnO:TiO_2$ ratio of 1:99.

EXAMPLE 10

The same procedure as in Example 1 was repeated, except that titanium oxide particles coated with an iron compound were used instead of the titanium oxides, to produce a photocatalyst composite of the present invention (Sample N). The content of the photocatalyst titanium oxide particles coated with the zinc compound in this Sample N was 90% by volume based on the total amount of the photocatalyst particles and the less degradative adhesive.

The titanium oxide particles coated with the iron compound were prepared as follows:

10 grams of titanium oxides obtained by hydrolysis under heat of titanyl sulfate were used to prepare a slurry of 100 grams/liter expressed as $TiO_2$. 2.9 ml of an aqueous solution of ferric chloride ($FeCl_3 \cdot 6H_2O$) at concentration of 5 grams/liter were added to the slurry and stirring was continued for one. hour. Thereafter a diluted aqueous ammonia was added to the slurry to adjust the pH to 7. After the slurry was stirred for one hour, the slurry was filtered, washed with water, and dried at a temperature of 110° C. for 3 hours to yield titanium oxide particles coated with the iron compound.

These titanium oxide particles had iron compounds thereon in an $Fe/TiO_2$ ratio of 300 ppm.

EXAMPLE 11

The same procedure as in Example 10 was repeated, except that the concentration of the aqueous solution of ferric chloride was 50 grams/liter, to produce a photocatalyst of the present invention (Sample O). The content of the photocatalyst titanium oxide particles coated with the iron compound in this Sample O was 90% by volume based on the total amount of the photocatalyst particles and the less degradative adhesive.

These titanium oxide particles had iron compounds thereon in an $Fe/TiO_2$ ratio of 3000 ppm.

EXAMPLE 12

The same procedure as in Example 1 was repeated, except that 8.9 grams of $TiO_2$ and 0.5 gram of active carbon were used, to prepare a photocatalyst composite according to the present invention (Sample P). The total amount of the titanium oxide and the active carbon of Sample P was 90% by volume based on the total amount of the titanium oxide, active carbon and less degradative adhesive.

EXAMPLE 13

The same procedure as in Example 12 was repeated, except that the active carbon was placed with a zeolite in an amount of 0.8 gram, to prepare a photocatalyst composite according to the present invention (Sample Q). The total amount of the titamium oxide and the zeolite was 90% by volume based on the total amount of the titanium oxide, zeolite and less degradative adhesive.

Observation of the less degradative adhesive in each of Samples L to Q revealed that there was found no weight loss. In other words, the less degradative adhesive of Samples L to Q was not degraded, and the titanium oxide particles were not released from the substrate.

Next, each of the Samples A, N and O of the present invention was placed in a 0.8 liter glass vessel and acetaldehyde as a malodorous component was added to the vessel to a concentration of 100 ppm and then the container was sealed. Then, the vessel was left to stand for 30 minutes and then irradiated with the black light at an ultraviolet intensity of 1 mW/cm$^2$ on the surfaces of each Sample for 60 minutes. After the irradiation, the concentration of acetaldehyde in the glass vessel was measured. The results are shown in Table 3. The Samples A, N and O decomposed effectively the acetaldehyde due to the photocatalytic function of titanium oxides.

TABLE 3

| | Sample | Concentration of acetaldehyde (ppm) |
|---|---|---|
| Example 1 | A | 10.5 |
| Example 10 | N | 2.0 |
| Example 11 | O | 0.4 |

Then, Samples M, P and Q were separately placed in respective 0.8-liter glass vessels. Malodorous methylmercaptan was added to the glass vessels in a concentration of about 500 ppm. Then, the vessels were sealed. Then, these vessels were left to stand for 2 hours without any irradiation with ultra-violet rays, and irradiated for 60 minutes with the black light in such a manner that the ultraviolet intensity on each of the samples was 1 mW/cm$^2$. After the irradiation, the concentration of the methylmercaptan in the vessels was measured. The results are shown in Table 4. From Table 4, it is clear that the methylmercaptan was effectively removed due to the function of the photocatalyst particles of Samples M, P and Q.

TABLE 4

|  | Sample | Concentration of Methylmercaptan (ppm) |
| --- | --- | --- |
| Example 9 | M | 72 |
| Example 12 | P | 90 |
| Example 13 | Q | 125 |

In the aforementioned examination, the concentration of the methylmercaptan in the vessels left to stand for 2 hours without irradiation with ultraviolet rays was 250 ppm for each of the samples. The concentration of metylmercaptan in the vessels left to stand for further one hour without irradiation with ultra-violet rays was 240 ppm for Samples M and Q and 220 ppm for Sample P.

The photocatalyst composite of the present invention comprises a substrate having photocatalyst particles thereon via a less degradative adhesive, and causes very little decomposition and degradation of the adhesive owing to the photocatalytic function. The present invention enables long-term firm adhesion of photocatalyst particles onto any substrate without damaging the photocatalytic function. The utilization of the photocatalyst composite of the present invention allows effective and prompt removal of deleterious materials, malodorous materials, oily components, bacteria, actinomyces, fungi, algae and the like. Therefore, the photocatalyst composite is very useful as deodorant and sterilizer both at home and in industry. In addition, the photocatalyst composite of the present invention can be used for an extended period of time, has a high degree of safety, finds applicability to a wide variety of deleterious materials, and is disposable without polluting the environment. Thus, it is very useful in industry. In the process for producing the photocatalyst composite according to the present invention, the use of fluorinated polymers as less degradative adhesives enables production of preferred photocatalyst composites, the surfaces of which have a lesser tendency to adsorb dust and contaminants due to weak sticking power of the fluorinated polymers.

The process for producing the photocatalyst composite according to the present invention is a useful process which can employ any materials such as plastics as substrate and produce conveniently and easily consistent quality photocatalyst composites.

The coating composition of the present invention can be coated or sprayed onto substrates of any form or desired sites thereof, and allows the ready utilizing of the photocatalytic function. Thus, particularly it is useful for domestic applications.

What is claimed is:

1. A photocatalyst composite comprising a substrate, a photocatalyst particles-free first layer of a less degradative adhesive, and a second layer comprising a mixture of the less degradative adhesive, and photocatalyst particles, wherein said first layer is provided on said substrate by coating or spraying said less degradative adhesive, said second layer is provided on said first layer, and the amount of said photocatalyst particles is within the range of 20 to 98% by volume based on the total amount of said less degradative adhesive and photocatalyst particles.

2. The photocatalyst composite according to claim 1, wherein the amount of said photocatalyst particles is within the range of 50 to 98% by volume based on the total amount of said less degradative adhesive and photocatalyst particles.

3. The photocatalyst composite according to claim 1, wherein the amount of said photocatalyst particles is within the range of 70 to 98% by volume based on the total amount of said less degradative adhesive and photocatalyst particles.

4. The photocatalyst composite according to claim 1, wherein the less degradative adhesive of said second layer is at least one selected from the group consisting of fluorinated polymers, silicone-based polymers and silicon compound.

5. The photocatalyst composite according to claim 1, wherein said second layer comprises said less degradative adhesive, said photocatalyst particles, and an adsorbent.

6. The photocatalyst composite according to claim 1, wherein said second layer further contains a coupling agent.

7. The photocatalyst composite according to claim 1, wherein said second layer further contains a cross-linking agent.

8. The photocatalyst composite according to claim 1, wherein the less degradative adhesive of said first layer is at least one selected from the group consisting of fluorinated polymers, silicone-based polymers and silicon compound.

9. The photocatalyst composite according to claim 1, wherein said first layer consists essentially of said less degradative adhesive, and inorganic particles having no photocatalytic function.

10. The photocatalyst composite according to claim 1, wherein said photocatalyst particles are of a titanium oxide.

11. The photocatalyst composite according to claim 1, wherein at least one selected from the group consisting of metals and metal compounds of V, Fe, Co, Ni, Cu, Zn, Ru, Rh, Pd, Ag, Pt and Au as a second component inside said photocatalyst particles and/or the surfaces thereof.

12. The photocatalyst composite according to claim 1, wherein said photocatalyst particles are of at least one titanium oxide selected from the group consisting of titanium oxides, hydrated titanium oxide, hydrous titanium oxide, metatitanates, orthotitanates and titanium hydroxide.

13. The photocatalyst composite according to claim 1, wherein said photocatalyst particles are of a compound obtained by hydrolyzing or neutralizing titanyl sulfate or titanium chloride, or of a product obtained by drying said compound, firing said compound or subjecting said compound to hydrothermal treatment.

14. A photocatalyst composite comprising a substrate, a photocatalyst particles-free first layer comprising a less degradative adhesive coated or sprayed on said substrate, and a second layer comprising a mixture of a less degradative adhesive of an inorganic adhesive, and photocatalyst particles, applied on said first layer.

15. The photocatalyst composite according to claim 14, wherein said inorganic adhesive is a silicon compound.

16. The photocatalyst composite according to claim 1, wherein said composite is used for removing materials such as deleterious materials, malodorous materials, oily components, bacteria, actinomyces, fungi, or algae, or preventing the deposition of algae, dusts or contaminants.

17. The photocatalyst composite according to claim 1, wherein removal of materials such as deleterious materials, malodorous materials, oily components, bacteria, actinomyces, fungi, or algae, or prevention of the deposition of algae, dusts or contaminants is made by applying onto said photocatalyst particles a ray having a wavelength of not less than the band gap energy of said photocatalyst particles contained in said composite.

18. A process for producing the photocatalyst composite according to claim 1, which comprises the steps of providing a first layer of a photocatalyst particles-free less degradative adhesive on a substrate by coating or spraying and then fixing said adhesive; providing on said first layer a mixture of a less degradative adhesive, and photocatalyst particles.

19. The process according to claim 18, wherein a coating composition comprising said photocatalyst particles and said less degradative adhesive, dispersed in a solvent, is coated or sprayed to place said second layer on said first layer.

20. The process according to claim 19, wherein said coating composition further contains an adsorbent.

21. The process according to claim 19, wherein said coating composition further contains a coupling agent.

22. The process according to claim 19, wherein said coating composition further contains a cross-linking agent.

23. The process according to claim 18, wherein at least one titanium oxide selected from the group consisting of titanium oxides, hydrated titanium oxide, hydrous titanium oxide, metatitanates, orthotitanates and titanium hydroxide, is used as said photocatalyst particles.

24. The process according to claim 23, wherein a compound obtained by hydrolyzing or neutralizing titanyl sulfate or titanium chloride, or of a product obtained by drying said compound, firing said compound or subjecting said compound to hydrothermal treatment, is used as said photocatalyst particles.

25. The process according to claim 18, wherein the step of fixing is carried out at a temperature of not higher than 400° C.

* * * * *